M. T. REEVES.
Assignor of one-sixth to J. I. IRWIN.
STRAW STACKER.
No. 10,208. Reissued Sept. 26, 1882.
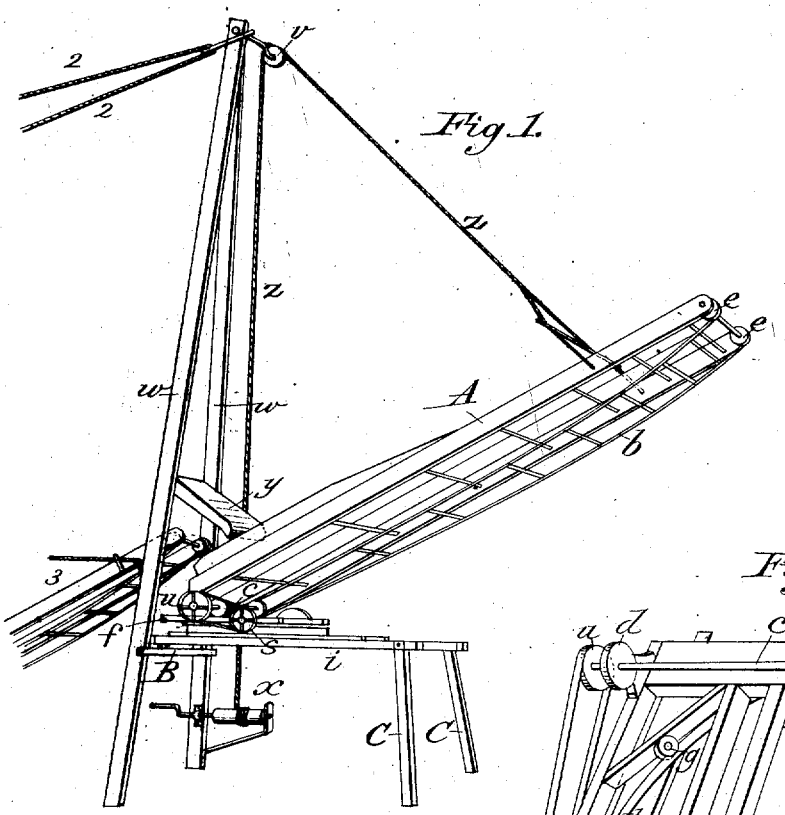
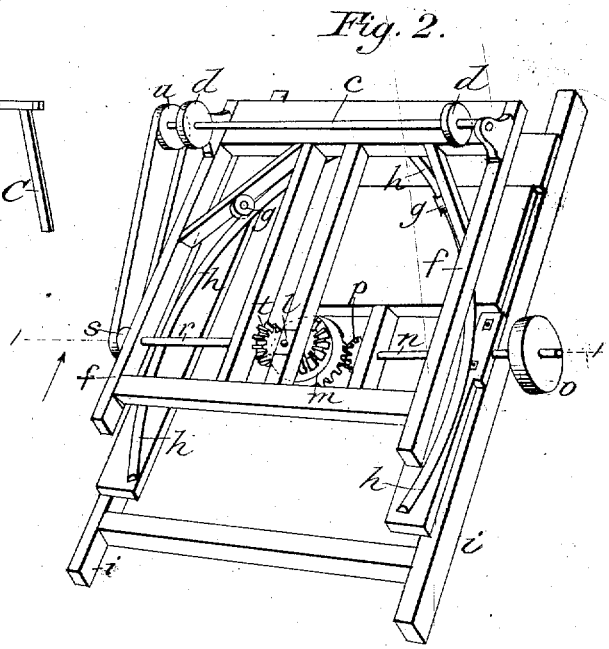
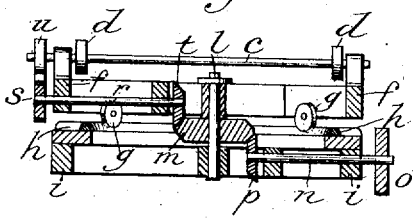
Attest:
H. H. Schott
Jno. A. Stockman
Inventor
Marshal T. Reeves

UNITED STATES PATENT OFFICE.

MARSHAL T. REEVES, OF COLUMBUS, INDIANA, ASSIGNOR OF ONE-SIXTH TO JOSEPH I. IRWIN, OF SAME PLACE.

STRAW-STACKER.

SPECIFICATION forming part of Reissued Letters Patent No. 10,208, dated September 26, 1882.

Original No. 252,623, dated January 24, 1882. Application for reissue filed August 9, 1882.

*To all whom it may concern:*

Be it known that I, MARSHAL T. REEVES, a resident of Columbus, county of Bartholomew, State of Indiana, have invented a new and useful Improvement in Straw-Stackers, of which the following is a specification, having reference to the accompanying drawings.

This invention relates to devices for receiving the straw from thrashing-machines and automatically building it into stacks, and especially to that class of straw-stacking machines in which the straw-carrier is adjustable both in horizontal and vertical planes in order to deposit the straw on different spots and at varying heights, as required in building the stack.

The said invention consists in the improved construction and combination of parts, as hereinafter set forth, and more particularly pointed out in the claims.

Figure 1 is a side elevation. Fig. 2 is a plan in perspective of the turn-table and its supporting-frame and the driving mechanism, the straw-carrier being removed. Fig. 3 is a vertical section through 1 1, Fig. 2.

The same letters indicate the same parts in all figures.

A is the straw-carrier, consisting of a wooden chute traversed from end to end in the ordinary manner by an endless belt or chain, *b*. The carrier is hinged at the lower end upon the shaft *c*, the endless chain passing over the driving-pulleys *d d*, Fig. 2, and the idlers *e e*, Fig. 1. The shaft *c* is mounted upon and revolves in suitable bearings on the frame *f*, as shown. The frame *f* is provided with grooved trucks *g g*, which travel upon the circular track *h*, Fig. 2, and it is secured to the main frame *i* by the pin *l*, which pin is located in the center of the circle described by the track *h*, Fig. 2, and serves as a shaft for the double-bevel wheel *m*, and also a pivot around which the frame *f* and the straw-carrier revolve. The main frame *i*, supporting the carrier and its driving mechanism, is supported at one end by a cross-bar, B, fastened to the derrick-poles *w w* at such a distance from the ground that a man of ordinary height can walk erect under it. The other end of the frame is supported by posts C C at a similar height. My object in supporting the main frame and its mechanism at this height and by these means is, first, to form a sufficient, clear, and unobstructed space underneath the lower end of my straw-carrier to receive the straw which unavoidably falls at this point in this class of stackers, so that it shall be easy of access to remove the accumulation of straw; and, second, to give the structure sufficient base, so that it will stand firmly when the carrier is swung to either side without the use of guy-ropes attached to stakes driven into the ground, such ropes being in the way of the workmen and teams.

The straw-carrier of the thrasher is designed to be so adjusted as to deliver the straw at a point as near as practicable and immediately over the rear end of my straw-carrier; and to prevent as much as possible the loss of straw at this point a hood or guard, *y*, is secured to the derrick to prevent the wind from blowing the straw and chaff about and to guide them into the second carrier. Said guard is to be made of metal, canvas, or other suitable material, one end being attached to the derrick-poles and the other depending over the straw-carrier. The derrick-poles *w w* are set wide apart at the bottom and converging toward a point at the top, where they are fastened together, and there sustain a pulley, *v*, in a vertical axial line over the center of horizontal rotation in the frame *f*. This position of the top of the derrick is adjusted by guy-ropes 2 2, extending forward and secured to some point on the thrasher, usually the rim of the wheels. A windlass, *x*, is secured to one of the derrick-poles, and a rope, *z*, passes from the windlass over pulley *v*, and, terminating in a sling, supports the outer free end of the straw-carrier. My object in placing the pulley *v* in a vertical axial line over the center of horizontal rotation in the frame *f* is that the carrier may maintain its position when swung to either side.

Mounted upon the main frame *i*, radially in line with pin *l*, is a shaft, *n*, to which are fastened the driving-pulley *o* and pinion *p*, which engages the bevel-wheel *m*. A shaft, *r*, is secured in suitable bearings to the frame *f*, radially in line with the pivot-pin *l*, and is provided with a pulley, *s*, and a pinion, *t*, which engages the bevel-wheel *m*; also, a belt passes around pulley *s* and pulley *u*, the latter pulley being secured to the shaft *c*. The object of this last-described mechanism is to drive the endless belt *b* in any desired position of the carrier by means of a belt carried from pulley *o* to some pulley on the thrasher.

The operation of my device is as follows: It is so placed in relation to the point of delivery of the straw from the thrasher that the straw as it falls will drop on that end of the carrier which is mounted upon the rotary frame *f*, the other end of the carrier being suspended by the rope, derrick, and windlass, so that the carrier is level, or nearly so. The thrasher is now started, and motion being imparted to the driving-pulley *o* by a belt carried either from a pulley on the thrasher or from some independent motor, motion is transmitted to the endless belt or chain *b* through the double-bevel wheel *m*, pinion *t*, shaft *r*, pulleys *s* and *u*, and pulleys *d d*. As the straw falls from the thrasher or common straw-carrier 3, connected with it, it is carried to the outer end of carrier A, where it falls to the ground to be covered by the stack. As the straw and chaff accumulate the outer end of the carrier is pushed around to one side or the other, describing an arc of a circle of which the center of the circular track *h* is the center. As the stack rises the free end of the straw-carrier is raised by the windlass *x* and held at any desired angle.

I am aware that straw-carriers have before been made which were mounted upon a turn-table, which has been supported on an independent frame-work and mounted upon wheels, or upon the rear part of the thrasher. Such structures have a narrow base, and are liable to upset when the carrier is swung to either side, unless braced by lateral guys, and are also objectionable on account of the difficulty of clearing away the droppings of straw before mentioned. By the use of my device these above-mentioned difficulties are avoided. The manner of forming the derrick and combining it with the main frame and with the carrier gives the structure a wide lateral base, avoiding the use of lateral guys secured to the ground, and giving a space for the dropping straw easy of access.

I claim as my invention—

1. In a stacking-machine, the combination, with a straw-carrier consisting of an endless belt, a chute, a turn-table on which said chute is mounted, and a driving mechanism adapted to run said belt in varying positions, of a main frame, and a derrick formed of two poles or masts set wide apart at the bottom and converging at the top toward a point considerably above the turn-table, and there connected, and forming a support for the free end of the carrier, and forming also above the base a support for one end of the main frame and turning carrier, as described and shown, for the purpose set forth.

2. In a stacking-machine, the combination, with a turning straw-carrier and a derrick consisting of two poles or masts set wide apart at the bottom, converging at the top, and forming a partial support above the base for said turning carrier, of a pulley suspended from said derrick in a vertical axial line over the center of rotation of the turning carrier, a windlass attached to said derrick, and a rope attached to and passing from the free end of said carrier over said pulley to said windlass, as described and shown, and for the purpose set forth.

3. In combination with fixed frame *i*, having circular track *h* thereon, pivoted frame *f*, trucks *g*, horizontal shaft *c*, and straw-carrier A, attached to said shaft and movable thereon, all constructed and operating substantially as set forth.

4. In combination with frame *i*, frame *f*, centrally pivoted thereto, shaft *c*, straw-carrier A, supported at its lower end by shaft *c*, chain or cord *z*, and a windlass for raising and lowering said straw-carrier, and pulley *v*, over which said chain passes, said pulley being arranged vertically above the pivotal point of frame *f*, substantially as and for the purpose set forth.

5. Vertical pin *l*, serving both as a shaft for double-bevel wheel *m* and as a pivot for frame *f*, in combination with frames *f* and *i*, gear-wheels *p*, *m*, and *t*, shafts *n* and *c*, and straw-carrier A, substantially as set forth.

6. In a straw-stacking machine having a turning straw-carrier, as described, and adapted for use in connection with the ordinary straw-carrier of a thrashing-machine, a derrick having its base separated from the thrasher and independently supported, a pulley suspended from the top of said derrick in a vertical line over the center of rotation of the turning carrier, a windlass, and a rope attached thereto and passing over said pulley as a means of adjustably supporting the free end of said straw-carrier.

MARSHAL T. REEVES.

Witnesses:
H. P. HOOD,
JNO. A. STOCKMAN.